(No Model.)
C. H. METZ.
BICYCLE PEDAL.
No. 546,071. Patented Sept. 10, 1895.
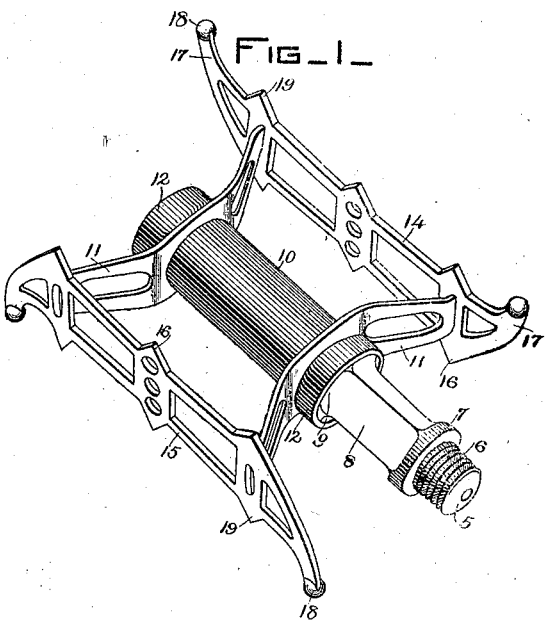
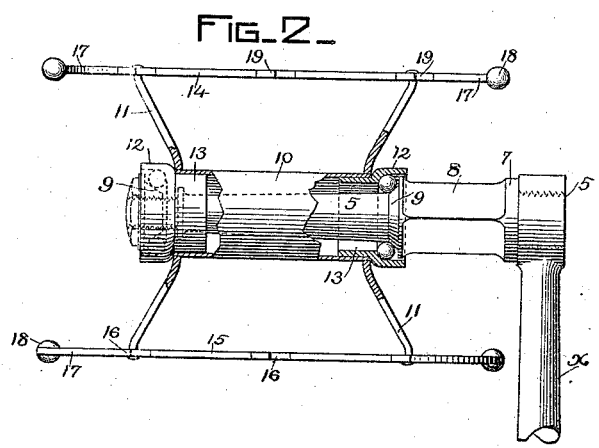
WITNESSES
A. A. Orne
Chas. H. Luther Jr
INVENTOR
Charles H. Metz
by Henry J. Miller
atty.

UNITED STATES PATENT OFFICE.

CHARLES H. METZ, OF WALTHAM, MASSACHUSETTS.

BICYCLE-PEDAL.

SPECIFICATION forming part of Letters Patent No. 546,071, dated September 10, 1895.

Application filed March 27, 1895. Serial No. 543,364. (No model.)

*To all whom it may concern:*

Be it known that I, CHARLES H. METZ, of Waltham, in the county of Middlesex and State of Massachusetts, have invented certain new and useful Improvements in Bicycle-Pedals; and I hereby declare that the following is a full, clear, and exact description of the same, reference being had to the accompanying drawings, forming part of this specification.

This invention refers to improvements in pedals which are particularly adapted for use on bicycle-cranks, but may be used on any crank-driving mechanism.

The object of the invention is to so construct a pedal that the tread of the crank may be narrowed without shortening the crank-shaft or its bearing.

Another object of the invention is to improve the construction of the pedal with reference to the means for holding the foot.

Another object of the invention is to so construct a bicycle-pedal that the forward portion of the rider's foot is positively held from lateral movement while the heel portion of the foot is free to swing, whereby the foot is more readily disengaged from the pedal when the rider is dismounting.

Another object is to provide a light and strong pedal, so constructed that the size of the same may be considerably reduced, while its effectiveness in holding and supporting the foot of the rider is increased.

The invention consists in the peculiar construction of the foot-plates.

The invention also consists in the short hub, the arms extending laterally from the hub, foot-plates longer than the hub, the end portions of which form horns or stops secured to the arms, and a pedal-shaft on which the hub is journaled, having a wrench-shoulder and a threaded end portion adjoining this shoulder.

The invention also consists in a pedal having a forward foot-plate, the end portions of which are extended upward to form stops, and a rear foot-plate having a short foot-supporting portion, together with a hub and arms extending from the hub to which said foot-plates are secured.

The invention also consists in such other novel features of construction and combination of parts as may hereinafter be more fully described, and pointed out in the claims.

Figure 1 represents a perspective view of the improved pedal. Fig. 2 represents a horizontal sectional view of the same, a portion of the hub being shown in full.

Similar numbers and letters of reference designate corresponding parts throughout.

In carrying my invention into practice it has been my desire to so improve the construction of a bicycle that the footing or tread of the foot will approach more nearly to the action of the feet in walking—that is, the feet, and consequently the pedals, should describe circles or move in arcs, which are as nearly as possible parallel with the plane in which the upper portion of the limb swings. As in walking the feet move by one another nearly in contact, so in operating a crank-driving mechanism the feet should be spread as little as possible, owing to the loss of power from a downward and at the same time sidewise thrust.

The importance of narrowing the tread of the cranks in a bicycle is offset by the equal importance of retaining a long crank-shaft, so that the bearings may be well separated, or the constant leverage exerted first at one end of the crank-shaft and then at the other would soon destroy the bearings. In addition to the space for the bearings the crank-shaft must be long enough to allow for the secure fixture of the sprocket-wheel. It being important to retain a full length of the crank-shaft the narrowing must be effected by making the pedals more compact, in bringing them close to the crank-arm, and in so constructing the pedal shaft or pintle that it may be secured to the crank-arm without the addition of the usual nut on the inner side of the arm. In constructing my device I have endeavored to so construct a bicycle-pedal that while possessing all the valuable characteristics of the pedals made prior to my invention the essential parts will be so fashioned and located that the pedal-shaft may be secured to the crank-arm by the engagement of the screw-threaded end of the shaft with the perforation in the crank-arm, at the same time so locating the engaging devices that the forward portion of the rider's shoe is held from lateral movement, while allowing the heel portion to more readily swing off from the pedal as the rider dismounts. As a valuable result of this construction, the ball-bearings and the arms connecting the hub with the foot-plates are brought under the ball of the rider's foot, so that the support given to the foot is rather of the nature of a strut than of a suspension device, as where the foot was supported between the bearings, and preventing the bending of the foot-plates between their ends when the rider's foot is accidentally brought down on the front or rear ends of the pedal instead of on the top of the pedal. It will now be seen that the portion of the pedal-shaft extending inward from the inner cross-plate may be so shaped or provided with such means as will facilitate the process of securing the shaft to the crank-arm. An open space between the ends of the foot-plates is also provided to allow for the insertion of a wrench or other tool to grasp the shaft.

In the drawings 5 represents the pedal pin or shaft, having the screw-threaded end 6, the abutment-shoulder 7, and the wrench-shoulder 8. This pin is also supplied with ball-bearing cones or bearing-surfaces 9 9 of any usual description.

The pedal proper consists of a hub or sleeve 10, of a diameter which is adapted to receive the pedal-shaft. To the ends of the sleeve or hub 10 are secured the cross-arms 11 11, the ends of which are bent outward from the planes in which the central portions and the ends of the sleeve 10 occupy. The raceways 12 12 for the ball-bearings are somewhat larger in diameter than the sleeve or hub 10 and have collars or sleeves 13, which are of a diameter to be inserted within the ends of the hub and to be embraced thereby, being held in place by frictional contact and by the contracting strain on the ball-cones, the larger raceways 12 bearing on the ends of the hub and being held in the separated positions thereby.

The parallel foot-plates 14 and 15 are secured to the outer ends of the cross-arms 11 11 in any usual manner, as by riveting. They are of similar construction, having each a main body longer than the hub 10, the studs or points 16 16 depending from the body, the horns or stops 17 17 curving upward from the body and sufficiently outward therefrom to receive a portion of the shoe-sole between them and to positively hold the same from lateral movement. On the ends of the horns or stops 17 are secured the knobs 18 18, serving as guards against the penetration of the pointed stops should the clothing or the rider be accidentally struck by them. Between the horns or stops 17 are the studs or points 19 19, which, like those marked 16 of the opposite edge, tend to prevent the slipping of the shoe.

Reference to the drawings will indicate that the foot-plates, including the horns or stops 17, extend inward nearly to the plane of the outer surface of the crank-arm X or to the abutment 7, so that while the width of the pedal is retained the wrench-shoulder of the shaft 5 is brought within the pedal and a considerable gain is made toward narrowing the tread.

The inclusion of that portion of the shaft within the pedal which is adapted to be engaged by a tool necessitates a construction whereby this portion of the shaft may be readily accessible. This is accomplished, first, by locating the stops, as 17, away from the hub, thereby allowing the hub to be shortened; second, by providing parallel foot-plates, which are connected to the hub beyond the engageable portion of the shaft, and, third, by shaping and securing the foot-plates, as herein shown, whereby the downward-curving horn of the rear foot-plate opposite the engageable portion of the shaft allows of access thereto.

While the rider's foot is held from lateral movement at the point of engagement by the stops 17 of the forward foot-plate, it will be evident that the heel portion of the shoe may be swung outward as the rider dismounts, this being facilitated by the setting of the foot-plates in opposite directions, whereby the stops on the rear plate are always turned from the rider, while those on the front plate are in positions to receive the foot.

Having thus described my invention, I claim as new and desire to secure by Letters Patent—

1. In a bicycle pedal, the combination with a hub, arms extending laterally from the hub, and parallel foot-plates secured to the arms, the end portions of which form horns or stops extending beyond the length of the hub, of a shaft or pintle having a screw-threaded end and a wrench shoulder adjacent to the end, and a crank arm having a screw-threaded opening into which the threaded end of the shaft may be screwed.

2. In a bicycle pedal, the combination, with a hub, of upwardly extending stops located out of the vertical plane of the hub, and rigidly connected with the hub.

3. In a bicycle pedal having a hub, a foot-supporting plate back of the hub and having inverted stops and an upper supporting portion shorter than the distance between the stops.

4. The combination with the pintle 5 having the threaded portion 6, the abutment 7 and the wrench shoulder 8, and furnished with cone bearings, of the hub 10 surrounding the pintle, the raceways 12—12 embracing the cone bearings and having the sleeves 13—13 secured in the hub, balls located in the raceways, the arms 11—11 secured to the hub, and parallel foot-plates 14 and 15 secured to the ends of the arms and extending beyond the length of the hub.

CHARLES H. METZ.

Witnesses:
MICHAEL H. LYNCH,
THOMAS A. DOLAN.

546,071.—*Charles H. Metz*, Waltham, Mass. IMPROVEMENT IN BICYCLE-PEDALS. Patent dated September 10, 1895. Disclaimer filed October 6, 1900, by the patentee.

Enters his disclaimer:

"To that part of the claim in said specification which is in the following words, to wit:

"'In a bicycle-pedal, the combination, with a hub, of upwardly-extending stops located out of the vertical plane of the hub, and rigidly connected with the hub,' being section 2 of said claim." [*Official Gazette, October 16, 1900.*]